United States Patent [19]

Hawley

[11] 4,217,367

[45] Aug. 12, 1980

[54] COMPOSITION AND METHOD FOR GROWING PARASITIC INSECT LARVAE

[75] Inventor: Robert L. Hawley, Chesterfield, Mo.

[73] Assignee: Ralston Purina Company, St. Louis, Mo.

[21] Appl. No.: 2,498

[22] Filed: Jan. 11, 1979

Related U.S. Application Data

[63] Continuation of Ser. No. 852,127, Nov. 16, 1977, abandoned.

[51] Int. Cl.$^2$ .............................................. A23K 1/18
[52] U.S. Cl. ...................................... 426/2; 426/656; 426/657
[58] Field of Search ................... 426/2, 656, 657, 805, 426/807; 119/2, 3, 4, 6, 15

[56] References Cited

U.S. PATENT DOCUMENTS

| 3,712,269 | 1/1973 | Letchworth | 119/1 |
| 3,893,420 | 7/1975 | Andreev et al. | 119/1 |

OTHER PUBLICATIONS

Gingrich, R. E. et al., "J. Econo. Entomology", vol. 64, 1971, pp. 678-683.
Gingrich, R. E., Annals of the Entomological Soc. of Amer., vol 57, No. 3, pp. 351-360, May 1964.

*Primary Examiner*—Robert A. Yoncoskie
*Attorney, Agent, or Firm*—Virgil B. Hill

[57] ABSTRACT

A method is described herein of growing parasitic insect larvae on a growth medium containing vegetable protein isolate and a slowly ionizable acid or acid producing salt sufficient to maintain a pH below 8.5.

7 Claims, No Drawings

COMPOSITION AND METHOD FOR GROWING PARASITIC INSECT LARVAE

This is a continuation application of U.S. Ser. No. 852,127, filed Nov. 16, 1977, now abandoned.

The present invention relates to a composition for and a method of growing parasitic insect larvae such as the screw worm larvae which feed on animal tissue and particularly that of mammals. This invention more specifically relates to adjustments to the media that render it more suitable as a foodstuff for the hatching of eggs and growth of larvae of parasitic insects. Employing this technique permits the use of vegetable protein which will provide the growth potential of nutria, mammalian flesh and other forms of animal-derived protein.

Since parasitic larvae, especially the Diptera, Calliphoridae are known to feed on and, in fact, grow in the flesh of animals and human beings, scientists previously experimented with artificial feeding and growing such larvae by simulating the live flesh of animals. Such simulation has been generally characterized by the use of various animal protein source materials. A typical formulation would not only contain one animal protein source material such as cottage cheese but would in addition contain other animal protein source materials such as whole egg, non-fat dry milk, dry blood or blood meal, and even casein in its pure, dry, powder form. The leading authority on nutritional studies for the screw worm is probably Richard E. Gingrich who has published Nutritional Studies on Screw Worm Larvae with Chemically Defined Media (1964 Annals of the Entomological Society of America; Volume 57, 351, 360) and Media Containing Liquefied Nutrients for Mass Rearing Larvae Of The Screw Worm (1971, J. Econo. Entomology Volume 64, pp. 678–683). Other prior art may be found in other nutritional studies or their bearing on the development of practical, oligidic diets for mass rearing of larvae. For example, there are U.S.D.A. Screw Worm Media Studies and Research papers which provide background information. Basically, the literature makes it clear that several animal protein source materials were used in combination with one another because it was believed that the complex protein metabolism of parasitic larvae and particularly the screw worm larvae made it necessary to combine all of these various animal protein materials in order to simulate the growth media which is inherently found in aminal flesh or nutria.

The present inventor however, has found that in spite of the complex protein metabolism of for example, screw worm lavae, it is possible to formulate an artificial growth medium or diet for parasitic larvae and particularly screw worms which will permit replacing portions of the animal protein source material. Vegetable protein source material may be used as its replacement; provided however, that additional buffering capacity is incorporated into the formulation. The various growth stimuli, nutritional requisites and essential amino acid contribution which were formally attributed to the various animal protein source materials and which were believed to be essential in simulating live tissue and in growing parasitic larvae, have been found by this inventor to be secondary to the contribution such materials make in merely bolstering the buffer capacity of the growth media.

This inventor offers the proposition that previous feeding studies in which successful growth media were determined by the final weights of the larvae which were reared in those growth media erroneously mislead the scientist. Since each different type or animal protein source material affected the final weight of the growing larvae differently, the various animal protein source materials were believed to contribute various metabolic stimuli. Since vegetable protein contains different levels of amino acids and metabolic stimuli then animal protein the ineffectiveness of vegetable protein was explainable. In actuality however, such vegetable protein source materials had lower buffer capacities. Even in animal media as the larvae continue to grow, they simultaneously discharge ammoniacal compounds which gradually increases the pH level of the system to a point that the larvae can no longer survive and thus weight gain is adversely affected. Animal protein source materials have relatively high buffering capacities. The present invention, however, reveals that vegetable protein source material which has inherently a much lower buffering capacity than animal protein source material can be used at least as effectively as the animal protein. It is merely necessary to add a slowly ionizable acid or acid producing salt such as Glucono delta lactone, adipic, malic, succinic or other types of low ionizing acids that are not themselves toxic to the species of parasitic insect which is being grown.

Only enough slowly ionizable acid or acid producing salt is needed to maintain an optimum pH of below 8.5 and preferably 7.5 in the growth media throughout the desired growth period. The nutritional needs and other growth stimuli can be at least partially supplied from the vegetable protein source material. A typical example of vegetable protein source material is isolated soy protein. Additional positive growth potential can be provided by both calcium sulfate and vitamin $B_2$. It is of note that their combined effect is greater than the sum of their individual effects. See Table I. Other vitamins will also provide positive growth potential.

The following example is provided to show the efficacy of growing parasitic insect larvae such as screw worm using a vegetable protein source material replacing cottage cheese protein in the growth media.

EXAMPLE I

The standard growing formula (less added water) was used as a control containing the following:

| | |
|---|---|
| Dry whole blood | 40% |
| Non-fat dry milk | 20% |
| Dry whole eggs | 20% |
| Dry cottage cheese | 20% |

The control as well as the formulations in Table I were fed to larvae. The starting room weights were determined by weighing the larvae after initial feeding in the starting room. The growing weights were measured after such growth that the larvae would be expected to survive.

In Table I note that the addition of vitamin $B_2$ or $CaSO_4$ alone will reduce starting room rates and growth weight but together an increase is observed.

TABLE I

| Ingredient | Control* | A(%) | B(%) | C(%) | D(%) | E(%) | F(%) | G(%) |
|---|---|---|---|---|---|---|---|---|
| Isolated Soy Protein | — | 100 | 95.2 | 91.7 | 89.8 | 85 | 91.7425 | 84.92518 |
| Glucono Delta Lactone | — | — | 4.8 | 8.3 | 10.2 | 7.6 | 8.2568 | 7.64327 |
| Calcium Sulfate | — | — | — | — | — | 7.4 | — | 7.43051 |
| Vitamin B$_2$ | — | — | — | — | — | — | 0.0007 | 0.00060 |
| Starting Rm Wt mg/100 larvae | 500 | 351 | 429 | 557 | 631 | 439 | 416 | 648 |
| Growing Room mg/larvae | 63.2 | 59.4 | 63.2 | 64.9 | 70.0 | 63.5 | 64.8 | 70.0 |

*Control Formula

| | |
|---|---|
| Dry whole blood | 40% |
| Non-fat dry milk | 20% |
| Dry whole eggs | 20% |
| Dry cottage cheese | 20% |
| | 100% |

Formulas A thru G replace the dry cottage cheese in the control formula.

As can be seen from the data by addition of the slowly ionizable acid, the larvae were observed to grow as well and even better on the vegetable protein substituted for the dry cottage cheese protein. It was also observed that a positive effect resulted from the use of calcium sulfate and from vitamin B$_2$.

What is claimed is:

1. A method of growing parasitic insect larvae on a growth medium containing a proteinaceous ingredient comprising:
   (a) mixing a nutritionally effective amount of a vegetable protein isolate and an animal protein material to provide the proteinaceous ingredient;
   (b) adding to said growth medium a slowly ionizable organic acid or acid producing salt thereof to maintain a pH below about 8.5 in the medium during the growth period of the larvae;
   (c) feeding the growth medium to the larvae.

2. The method of claim 1 wherein the vegetable protein isolate is a soy isolate.

3. The method of claim 1, wherein a pH below about 7.5 is maintained in the medium during the growth period.

4. The method of claim 1 wherein the organic acid is glucono-delta-lactone.

5. A method of growing parasitic insect larvae on a growth medium containing a proteinaceous ingredient comprising:
   (a) providing a vegetable protein isolate as the proteinaceous ingredient;
   (b) adding to said growth medium a slowly ionizable organic acid or acid producing salt thereof to the medium during the growth period of the larvae;
   (c) feeding the growth medium to the larvae.

6. The method of claim 5 wherein the organic acid is glucono-delta-lactone.

7. The method of claim 5 wherein a pH below about 7.5 is maintained in the medium during the growth period.

* * * * *